US007185736B2

(12) United States Patent
McCarty

(10) Patent No.: US 7,185,736 B2
(45) Date of Patent: Mar. 6, 2007

(54) AERODYNAMIC NOISE ABATEMENT DEVICE AND METHOD FOR AIR-COOLED CONDENSING SYSTEMS

(75) Inventor: Michael W. McCarty, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 374 days.

(21) Appl. No.: 10/647,799

(22) Filed: Aug. 25, 2003

(65) Prior Publication Data

US 2005/0045416 A1 Mar. 3, 2005

(51) Int. Cl.
*F16K 47/02* (2006.01)
*F16L 55/045* (2006.01)
*B05B 7/06* (2006.01)
*B01F 13/02* (2006.01)
*E04F 17/04* (2006.01)

(52) U.S. Cl. ...................... 181/224; 239/431; 366/107; 181/233

(58) Field of Classification Search ........ 181/224–226, 181/220, 259, 270, 261, 233, 234; 454/262, 454/906, 206, 346, 352; 60/649, 296, 646; 138/40, 42; 239/431; 366/107
See application file for complete search history.

(56) References Cited

U.S. PATENT DOCUMENTS

| | | | | | |
|---|---|---|---|---|---|
| 1,473,449 | A | * | 11/1923 | Stearns et al. | 261/115 |
| 2,916,101 | A | * | 12/1959 | Naman | 181/224 |
| 3,217,488 | A | * | 11/1965 | Von Ohain et al. | 60/202 |
| 3,220,710 | A | * | 11/1965 | Forster | 261/69.1 |
| 3,332,442 | A | * | 7/1967 | Reed | 137/896 |
| 3,515,499 | A | | 6/1970 | Beer et al. | 416/95 |
| 3,719,524 | A | * | 3/1973 | Ripley et al. | 417/180 |
| 4,041,710 | A | * | 8/1977 | Kraus et al. | 60/673 |
| 4,073,832 | A | * | 2/1978 | McGann | 261/118 |
| 4,132,077 | A | * | 1/1979 | Johnson | 60/649 |
| 4,203,706 | A | * | 5/1980 | Hess | 416/97 A |
| 4,221,539 | A | * | 9/1980 | Corrigan | 416/97 A |
| 4,314,794 | A | * | 2/1982 | Holden et al. | 416/97 A |
| 4,315,559 | A | * | 2/1982 | Casey | 181/265 |
| 4,392,062 | A | * | 7/1983 | Bervig | 60/689 |

(Continued)

FOREIGN PATENT DOCUMENTS

| | | | |
|---|---|---|---|
| CH | 362093 | * | 5/1962 |

(Continued)

OTHER PUBLICATIONS

Severe Service Journal, Jul. 2001, vol. 3, Issue 6, Fisher Controls International, Inc., pp. 1-3.*

(Continued)

*Primary Examiner*—Edgardo San Martin
(74) *Attorney, Agent, or Firm*—Marshall, Gerstein & Borun LLP

(57) ABSTRACT

The noise abatement device and method described herein makes known an apparatus and method for reducing the aerodynamic resistance presented by a fluid pressure reduction device in a large duct. More specifically, a noise abatement device is disclosed having at least one sparger with an aerodynamic profile that significantly reduces the fluid resistance within a turbine exhaust duct of an air-cooled condensing system that may be used in a power plant.

12 Claims, 7 Drawing Sheets

U.S. PATENT DOCUMENTS

| | | | | |
|---|---|---|---|---|
| 4,705,455 | A * | 11/1987 | Sahm et al. | 416/97 R |
| 5,025,831 | A * | 6/1991 | Wong et al. | 137/561 A |
| 5,041,246 | A * | 8/1991 | Garrison | 261/78.2 |
| 5,201,634 | A * | 4/1993 | Hough | 416/96 R |
| 5,458,461 | A * | 10/1995 | Lee et al. | 416/97 R |
| 6,026,859 | A * | 2/2000 | Wears et al. | 137/625.33 |
| 6,179,997 | B1 * | 1/2001 | Vedder et al. | 208/113 |
| 6,739,426 | B2 * | 5/2004 | Sherikar et al. | 181/248 |
| 2004/0177613 | A1 * | 9/2004 | DePenning et al. | 60/649 |

FOREIGN PATENT DOCUMENTS

DE 1215731 9/1964

OTHER PUBLICATIONS

Severe Service Journal, Nov. 2001, vol. 1, Issue 1, Fisher COntrols International, Inc. pp. 1-3.*

Severe Service Journal, Dec. 2002, vol. 2, Issue 4, Fisher Controls International, Inc., pp. 1-2.*

Turbine Bypass Condenser Dump Applications, Fisher Controls Product Bulletin, 85.1:020, Jul. 2002, pp. 1-8.*

Design CVX Series Steam Condensing Valves, Fisher Controls Product Bulletin, 85.1:CVX, Aug. 2002, pp. 1-12.*

Control Components, Inc. Valve Product Literature, 23 pages (date unknown).

"Dangerous Noise Level Problem Solved in Industrial Back-Pressure Turbine", CCI Solutions, Retrieved from the Internet: URL:www.ccisolutionsonline.com/oilandgas/5/5-6.html, 2000, 2 pages.

International Search Report in PCT/US04/23744 dated Nov. 29, 2004.

Written Opinion in PCT/US04/23744 dated Nov. 29, 2004.

* cited by examiner

AERODYNAMIC NOISE ABATEMENT DEVICE AND METHOD FOR AIR-COOLED CONDENSING SYSTEMS

TECHNICAL FIELD

The noise abatement device and method described herein make known an apparatus and method for reducing the aerodynamic resistance presented by a fluid pressure reduction device in a duct. More specifically, a noise abatement device is disclosed having at least one sparger with an aerodynamic profile that significantly reduces the fluid resistance within a turbine exhaust duct of an air-cooled condensing system.

BACKGROUND

Modern power generating stations or power plants use steam turbines to generate power. In a conventional power plant, steam generated in a boiler is fed to a turbine where the steam expands as it turns the turbine to generate work to create electricity. Occasional maintenance and repair of the turbine system is required. When the turbine is taken out of service, it is typically more economical to continue boiler operation rather than shutting the boiler down during turbine repair. To accommodate this, the power plant is commonly designed with supplemental piping and valves that circumvent the steam turbine and redirect the steam to a recovery circuit that reclaims the steam for further use. The supplemental piping is conventionally known as a turbine bypass circuit.

When the turbine bypass circuit is in operation, steam that is routed away from the turbine must be recovered or returned to water. To return the steam to water, a system must be designed to remove the heat of vaporization from the steam, thereby forcing it to condense. An air-cooled condenser is often used to recover steam from both the turbine bypass circuit and the steam exhausted from the turbine. The air-cooled condenser facilitates heat removal by forcing low temperature air across a heat exchanger in which the steam circulates. The residual heat is transferred from the steam through the heat exchanger directly to the surrounding atmosphere.

Typical air-cooled condensers have temperature and pressure limits. Because the steam from the turbine bypass circuit or bypass steam has not produced work through the turbine, its pressure and temperature is greater than the turbine-exhausted steam. As a result, the higher temperature and pressure of the bypass steam must be conditioned or reduced prior to entering the air-cooled condenser to avoid damage to the condenser. Cooling water is typically injected into the bypass steam to moderate the steam's temperature. To control the bypass steam's pressure prior to entering the condenser, control valves, and more specifically, fluid pressure reduction devices, commonly referred to as spargers, are used. The spargers are restrictive devices that reduce fluid pressure by transferring and absorbing fluid energy contained in the bypass steam. Typical spargers are constructed of a cylindrical, hollow housing or a perforated tube that protrudes into the turbine exhaust duct. The bypass steam is received in the hollow housing and transferred by the sparger into the duct through a multitude of fluid passageways to the exterior surface. By dividing the incoming fluid into progressively smaller, high velocity fluid jets, the sparger reduces the flow and the pressure of the incoming bypass steam and any residual cooling water within acceptable levels prior to entering the air-cooled condenser.

In power plants with multiple steam generators, multiple spargers are mounted into the turbine exhaust duct. Because of space limitations within the duct, the spargers are generally spaced very closely and may impede the flow of exhaust steam from the steam turbine into the air-cooled condenser. Steam turbines are designed to exhaust into a specific back-pressure within the turbine exhaust duct to optimize their operation. The back-pressure within the turbine exhaust duct is directly related to the aerodynamic resistance or drag presented by the spargers. Conventional spargers used in modern power plants do not minimize the drag within the duct and subsequently can reduce the efficiency and output of turbine.

Applications with conventional spargers may not only limit turbine performance, but can also impact the expense and design of the air-cooled condenser. For example, the number of turbines used in the power plant determine the size and volume of the air-cooled condenser, including the available area to mount the spargers within the turbine exhaust duct. Back-pressure restrictions introduced by the conventional spargers in the condenser circuit limit the total heat reduction the bypass steam that can be achieved thereby increasing the size and cost of the entire air-cooled condenser system.

SUMMARY

The present aerodynamic noise abatement device and method may be used to reduce the aerodynamic resistance presented by fluid pressure reduction device and more specifically, a noise abatement device is disclosed having at least one sparger with a cross-sectional profile that significantly reduces the fluid resistance and back-pressure within the turbine exhaust duct of an air-cooled condensing system that may be used in a power plant.

In accordance with another aspect of the present aerodynamic noise abatement device, an aerodynamic sparger is assembled from elliptically-shaped, stacked disks along a longitudinal axis that define flow passages connecting a plurality of inlets to the exterior outlets. The stacked disks create restrictive passageways to induce axial and lateral mixing of the fluid in staged pressure reductions that decrease fluid pressure and subsequently reduce the aerodynamic noise within the sparger.

In accordance with yet another aspect of the present aerodynamic noise abatement device, an aerodynamic sparger fashioned from a stack of disks with tortuous paths positioned in the top surface of each disk are assembled to create fluid passageways between the inlet and outlets of the sparger. The tortuous paths permit fluid flow through the spargers and produce a reduction in fluid pressure.

In another embodiment, a method to substantially reduce aerodynamic resistance presented by a noise abatement device within the turbine exhaust duct of an air-cooled condenser is established.

BRIEF DESCRIPTION OF THE DRAWINGS

The features of this aerodynamic noise abatement device are believed to be novel and are set forth with particularity in the appended claims. The present aerodynamic noise abatement device may be best understood by reference to the following description taken in conjunction with the accompanying drawings in which like reference numerals identify like elements in the several figures and in which:

DETAILED DESCRIPTION

To fully appreciate the advantages of the present sparger and noise abatement device, it is necessary to have a basic understanding of the operating principles of a power plant and specifically, the operation of the closed water-steam circuit within the power plant. In power plants, recycling and conserving the boiler water significantly reduces the power plant's water consumption. This is particularly important since many municipalities located in arid climates require power plants to reduce water consumption.

Figure 1A:
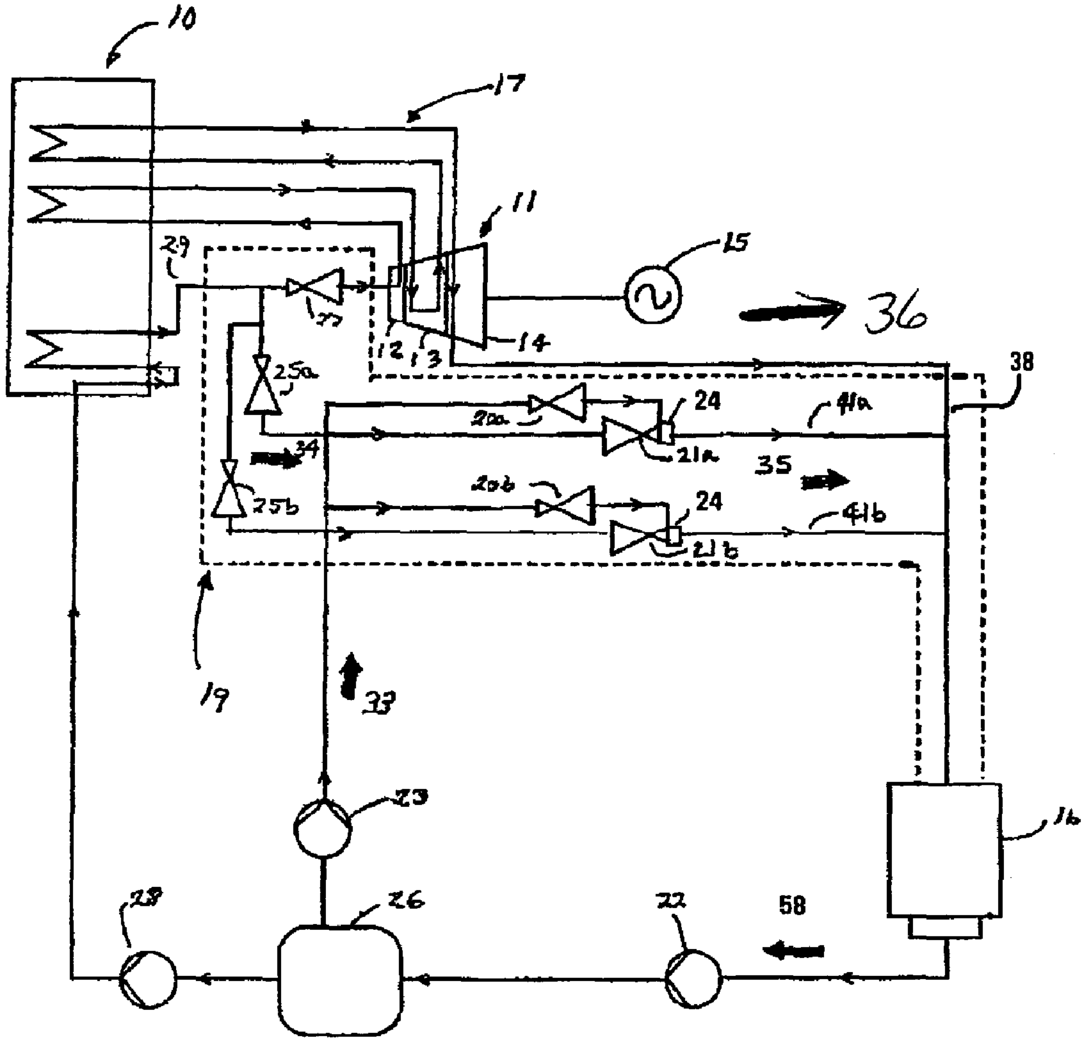
FIG. 1A is a block diagram depicting a steam turbine bypass circuit in a typical power plant.

Turning to the drawings and referring initially to FIG. 1A, a block diagram of a steam turbine bypass circuit of a power plant is illustrated. The power generation process begins at the boiler 10. Energy conversion in the boiler 10 generates heat. The heat transforms the water pumped from a feedwater tank 26, using a feedwater pump 28, into steam. The feedwater tank 26 serves as a reservoir for the water-steam circuit. A series of steam lines or pipes 17 directs the steam from the boiler 10 to drive a steam turbine 11 for power generation. A rotating shaft (not shown) in the steam turbine 11 is connected to a generator 15. As the generator 15 turns, electricity is produced. The turbine-exhausted steam 36 from the steam turbine 11 is then transferred through a turbine exhaust duct 38 to an air-cooled condenser 16 where the steam is converted back to water. The recovered water 58 is pumped by the condensate pump 22 back to the feedwater tank 26, thus completing the closed water-steam circuit for the turbine-exhausted steam 36.

Most modern steam turbines employ a multi-stage design to improve the plant's operating efficiency. As the steam is used to do work, such as to turn the steam turbine 11, its temperature and pressure decrease. The steam turbine 11 depicted in FIG. 1A has three progressive stages: a High pressure (HP) stage 12, an Intermediate Pressure (IP) stage 13, and a Low pressure (LP) stage 14. Each progressive turbine stage is designed to use the steam with decreasing temperature and pressure. However, the steam turbine 11 is not always operational. For economic reasons, the boiler 10 is rarely shutdown. Therefore, another means to condition the steam must be available when the steam turbine 11 is not available. A turbine bypass circuit 19 is typically used to accomplish this function.

During various operational stages within the plant, such as startup and turbine shutdown, a turbine bypass circuit 19, as illustrated in FIG. 1A, circumvents the steam turbine loop described above. Numerous bypass schemes are typically employed in a power plant. Depending on the origin of the steam, whether it is from the HP stage 12 or IP stage 13, and the operational stage of the plant, different techniques are required to moderate the steam prior to entering the air-cooled condenser 16. The HP bypass scheme illustrated in FIG. 1A is employed during turbine shutdown and adequately illustrates the operating conditions that require the present aerodynamic noise abatement device. During HP bypass, the turbine bypass circuit 19 receives steam from the piping 29 that supplies steam to the HP stage 12 of the steam turbine 11, thus bypassing the steam turbine 11. For example, during these maintenance periods, an HP inlet valve 27 is operated in opposite fashion of the block valves 25*a–b* to shift steam from the steam turbine 11 directly to the turbine bypass circuit 19.

Bypass steam 34 entering the turbine bypass circuit 19 in HP bypass is typically at a higher temperature and higher pressure than the air-cooled condenser 16 is designed to accommodate. Bypass valves 21*a–b* are used to take the initial pressure drop from the bypass steam 34. As understood by those skilled in the art, multiple bypass lines generally feed parallel bypass valves 21*a–b* to accommodate the back-pressure required by the steam turbine 11. Alternate applications may require a single bypass line or can supplement the parallel bypass system depicted in FIG. 1A as the steam turbine 11 would dictate. Typically, the bypass steam pressure is reduced from several hundred psi to approximately fifty psi.

To moderate the temperature of the bypass steam 34 exiting the boiler 10, spray water valves 20*a–b* receive spray water 33 from a spray water pump 23. The spray water 33 is injected into a desuperheater 24 where the lower temperature spray water 33 is mixed into the bypass steam 34 to condition the bypass steam 34 or reduce its temperature in the range of several hundred degrees Fahrenheit. In the process of reducing the temperature of the bypass steam 34, the spray water 33 is almost entirely consumed through evaporation. The conditioned steam 35 is inserted into the air-cooled condenser 16 through piping 41*a–b* that penetrates the turbine exhaust duct 38, thus completing the fluid path of turbine bypass circuit 19. The steam turbine stages are designed to operate with a specific differential pressure across each stage. The differential pressure across each stage acts to govern the turbine stage speed to ensure optimal production of electricity without damaging the steam turbine 11. During turbine operation, the sparger may not be operating, but it still presents an obstruction in the turbine exhaust flow path and therefore creates a resistance to exhaust fluid flow influencing turbine back-pressure.

Figure 1B:
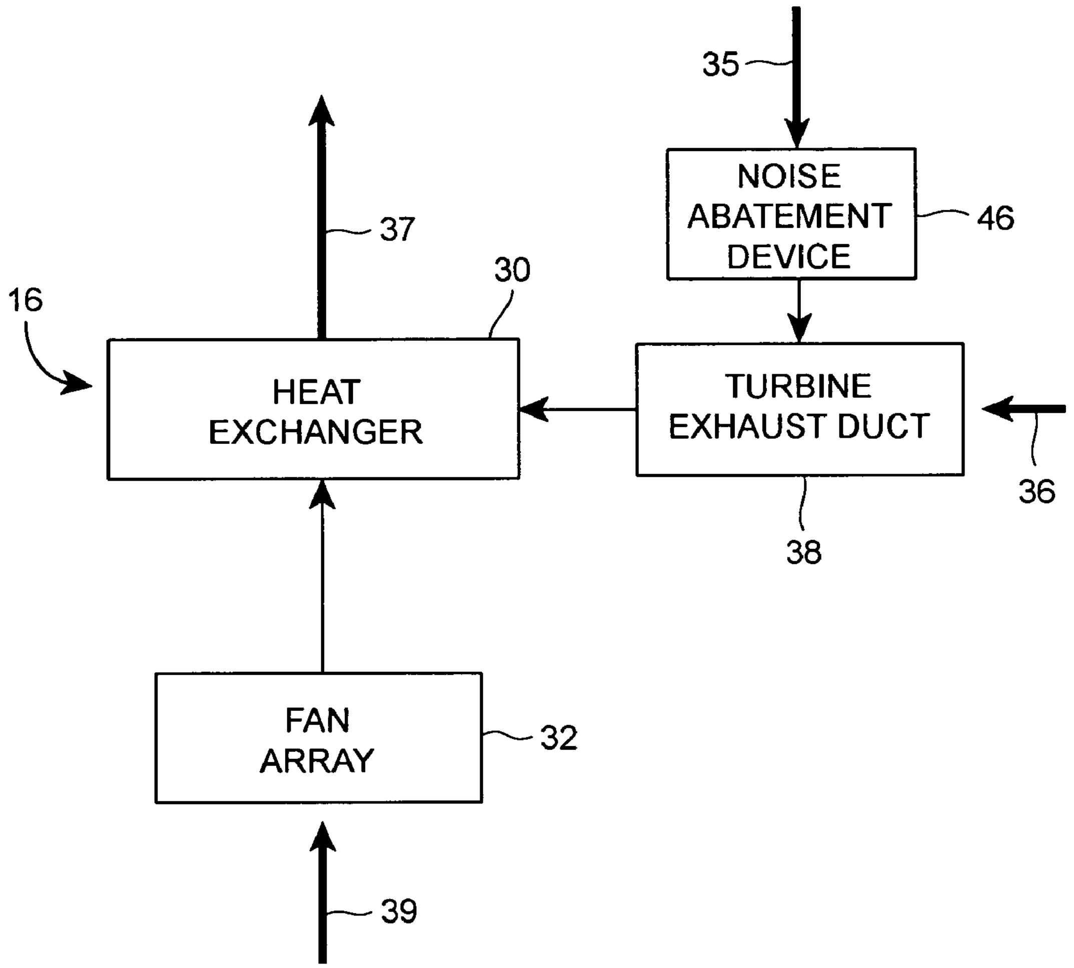
FIG. 1B is block diagram used to illustrate the components of an air-cooled condenser used in the turbine bypass circuit of FIG. 1A.

Referring now to FIG. 1B, the primary components of the air-cooled condenser 16 are depicted in block diagram form. In the air-cooled condenser 16, steam is routed through the turbine exhaust duct 38 and then to the heat exchanger 30. As previously described, the heat exchanger 30 works like a typical radiator. That is, in a typical radiator, steam is circulated within the radiator. The heat from the steam is conducted through the walls of the radiator and radiated to the surrounding atmosphere. In the air-cooled condenser 16, turbine-exhausted steam 36 enters the heat exchanger 30 directly through the turbine exhaust duct 38. Conditioned steam 35 is fed into the turbine exhaust duct 38 through a noise abatement device 46 from a steam line 41*b* as it exits the desuperheater 24 referenced in FIG. 1A. The turbine exhaust duct 38 directly feeds the heat exchanger 30. Steam condensation within the air-cooled condenser 16 is achieved by forcing high velocity, low temperature air 39 across the heat exchanger 30 by a fan array 32, which then carries the residual heat 37 from the heat exchanger 30 to the surrounding atmosphere, forcing the steam to condense.

As illustrated and described in connection with FIG. 1A, the heat exchanger 30 will receive steam from multiple sources independently, either conditioned steam 35 or turbine-exhausted steam 36. In HP bypass, as depicted in FIG. 1A, the valves 25 and 27 are operated in such a manner that in the present embodiment the turbine-exhausted steam 36 and the conditioned steam 35 are not flowing to the heat exchanger 30 simultaneously, but, as understood by those skilled in the art, this description is not intended to be limiting to the noise abatement device described herein.

Figure 2A:
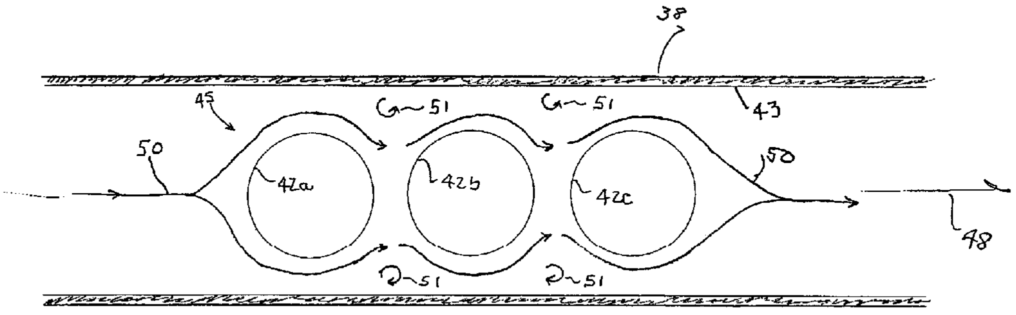
FIG. 2A is a top view illustrating the aerodynamic performance of a noise abatement device using three cylindrical spargers.

Referring now to FIG. 2A, a top view illustrating the aerodynamic interaction between the fluid flowing through the turbine exhaust duct 38 and a typical noise abatement device 45 designed with a collinear array of conventional spargers 42*a–c* is shown. The cylindrical design of the conventional spargers 42*a–c* is generally derived from fluid pressure reduction devices or attenuators intended for use in valve bodies and pipes that lend themselves to cylindrical cross-sections. This design is not optimal for use in turbine exhaust ducts.

Figure 2B:
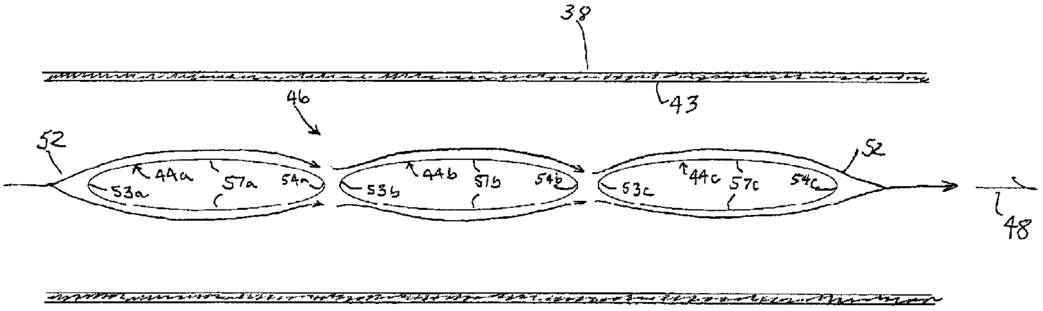
FIG. 2B is a top view illustrating the aerodynamic performance of the present noise abatement device using a collinear array of three aerodynamic spargers.

As known to those skilled in the art, Bernoulli's Law describes fluid pressure as being inversely proportional to fluid velocity. With respect to flow of a compressible fluid, such as steam flowing through a turbine exhaust duct, any obstruction to steam flow that decreases the steam velocity creates corresponding increases in steam pressure. As previously discussed, steam turbines are designed to exhaust into a specific back-pressure within the turbine exhaust duct to optimize their operation. The back-pressure within the turbine exhaust duct is directly related to the aerodynamic resistance or drag presented by the spargers, particularly in multiple sparger applications. The cylindrical shape of the conventional spargers 42*a–c* typically maximizes the cross-sectional area of the sparger encountered by the fluid as it flows through the turbine exhaust duct 38. FIG. 2A illustrates the splitting of the fluid as it encounters the spargers 42*a–c*. The obstruction presented by the sparger 42*a–c* creates an impediment to fluid flow, forcing substantial flow separation, as indicated by the flow arrows 50, subsequently decreasing the fluid velocity and increasing fluid pressure or back-pressure upstream from the spargers 42*a–c*. The substantial flow separation induced by the conventional spargers 42*a–c* forces turbulent eddy currents 51 to contact with inner walls 43 of the turbine exhaust duct 38 creating additional fluid resistance within the flow stream, further increasing the upstream pressure. Quite the opposite, the present aerodynamic spargers 44*a–c* substantially reduces the fluid resistance, and therefore the back-pressure, within the turbine exhaust duct 38 as shown in FIG. 2B.

As shown, the noise abatement device 46 has a collinear array of three aerodynamic spargers 44*a–c*. To substantially reduce the back-pressure within the turbine exhaust duct 38 caused by the aerodynamic spargers 44*a–c*, each aerodynamic sparger 44*a–c* is shaped similar to the airfoil on an aircraft or a hydrofoil on a ship. A leading edge 53*a* of the aerodynamic sparger 44*a* efficiently splits fluid along its elongated side wall 57*a*, as indicated by flow arrows 52, providing decreased flow turbulence within the turbine exhaust duct 38. The aerodynamic shape of each sparger 44*a–c* reduces the aerodynamic resistance, allowing the fluid to flow substantially undisturbed along the elongated side walls 57*b–c* of the each remaining spargers 44*b–c*. The fluid flow efficiently transitions from each sparger 44*a–c* along the respective trailing edges 54*a–c*, ultimately rejoining at the trailing edge 54*c* of the aerodynamic sparger 44*c*, thereby completing the downstream pressure recovery with the fluid progressing to the air-cooled condenser. Consequently, the turbulent eddy currents 51 depicted in FIG. 2A are substantially eliminated by the present noise abatement device 46 (shown in FIG. 2B).

In conventional applications, the back-pressure limitations imposed by cylindrical cross section spargers 42*a–c* can limit both the individual flow capacity of the sparger and the system flow capacity of the air-cooled condenser. The flow capacity of a typical sparger is constrained by the sparger geometry. The circular cross-section of typical spargers 42*a–c* limits the available flow area to an arc defined by the radius of the sparger. Generally, to increase the flow area, and therefore to increase the flow capacity, the height of conventional spargers 42*a–c* must be increased. The height of a conventional sparger also limits the system flow capacity of the air-cooled condenser. As further understood by those skilled in the art, spargers are not limited to collinear placement within the turbine exhaust duct. For example, some applications may dictate that multiple spargers be placed in various arrangements about the circumference of the turbine exhaust duct. Air-cooled condenser applications using high capacity, multiple spargers in either a collinear or circumferential configuration experience increased aerodynamic resistance due to a decrease in open cross-sectional area within the turbine exhaust duct caused by the increased stack height used in conventional sparger designs.

Relative to the conventional spargers 42*a–c* illustrated in FIG. 2A, the present aerodynamic spargers 44*a–c* provides increased flow area through elongated side walls 57*a–c* of the spargers 44*a–c*, allowing a decrease in the overall stack height of the spargers 44*a–c*. Additionally, the decreased cross-sectional area presented by the aerodynamic spargers 44*a–c* of the present noise abatement device 46 further reduces the aerodynamic resistance in the fluid flow path, thereby reducing the back-pressure experienced by the turbine 11 and subsequently providing the ability to increase the flow capacity to the air-cooled condenser 30.

Figure 3:
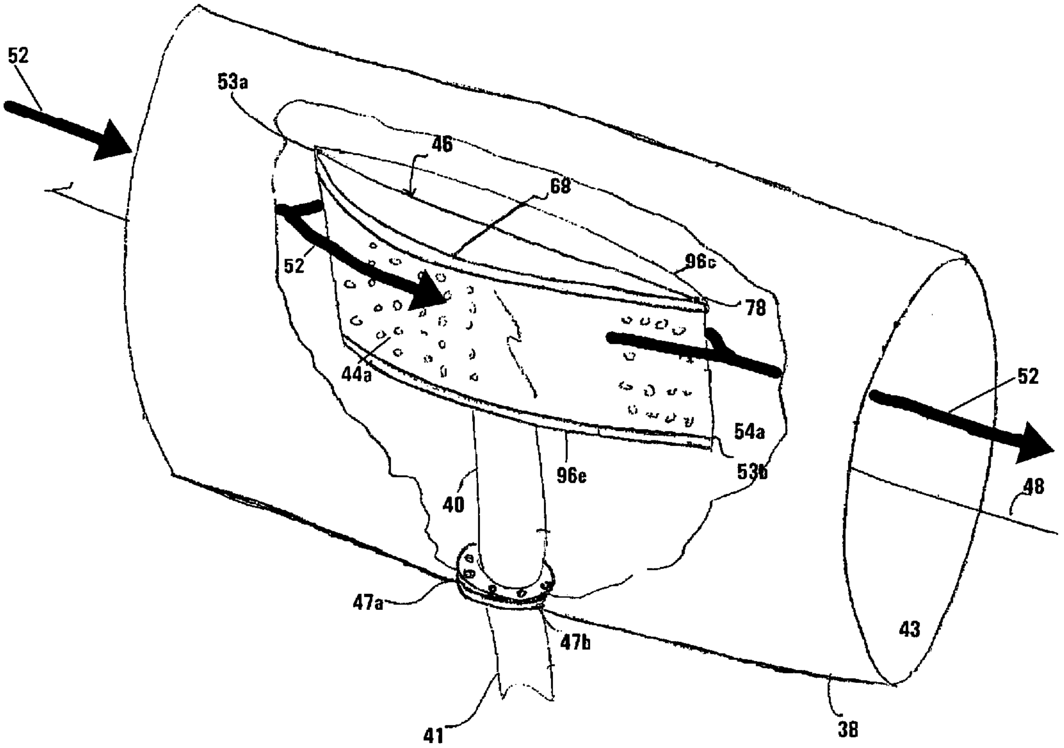
FIG. 3 is a partial section perspective view of an aerodynamic sparger positioned with a turbine exhaust duct.

The profile of the aerodynamic sparger is application specific. For example, the aerodynamic spargers 44*a–c* have an elliptically-shaped profile. The preferred ratio of the major axis 78 to the minor axis 68 of the elliptical profile is approximately five-to-one (shown in FIG. 3). Those skilled in the art can appreciate that other ratios and profiles can be created without departing from the spirit and scope of the present noise abatement device. The partial sectioned perspective view of FIG. 3 illustrates the aerodynamic noise abatement device 46 positioned inside the turbine exhaust duct 38. The noise abatement device 46 is fashioned about a single aerodynamic sparger 44*a* positioned within the turbine exhaust duct 38. As explained in greater detail below, the sparger 44*a* creates the final pressure drop required by the air-cooled condenser by dividing the flow of the incoming fluid into many small jets through a plurality of passageways about the periphery of the sparger 44*a*.

In the noise abatement device 46, the aerodynamic sparger 44*a* is preferably placed along the longitudinal axis 48 of the turbine exhaust duct 38 to utilize its minimized cross-sectional area to reduce the aerodynamic resistance within the turbine exhaust duct 38. The bypass steam 34, which has been mixed with spray water 33 at the desuperheater 24 (FIG. 1A), enters the turbine exhaust duct 38 through the steam lines 41*a–b*. As depicted in FIG. 3, the sparger 44*a* placed within the turbine exhaust duct 38 has an individual penetration. Flanges 47*a–b* are used to seal the turbine exhaust duct 38 at the penetration points of the aerodynamic noise abatement device 46. The aerodynamic sparger 44*a* is connected through conventional techniques using pipes 40 as illustrated in FIG. 3. As described herein, the pressure of the reduced bypass steam 34 is typically in the range of 50 psi. Several embodiments of the aerodynamic sparger 44*a* will now be explained in detail.

Figure 4:
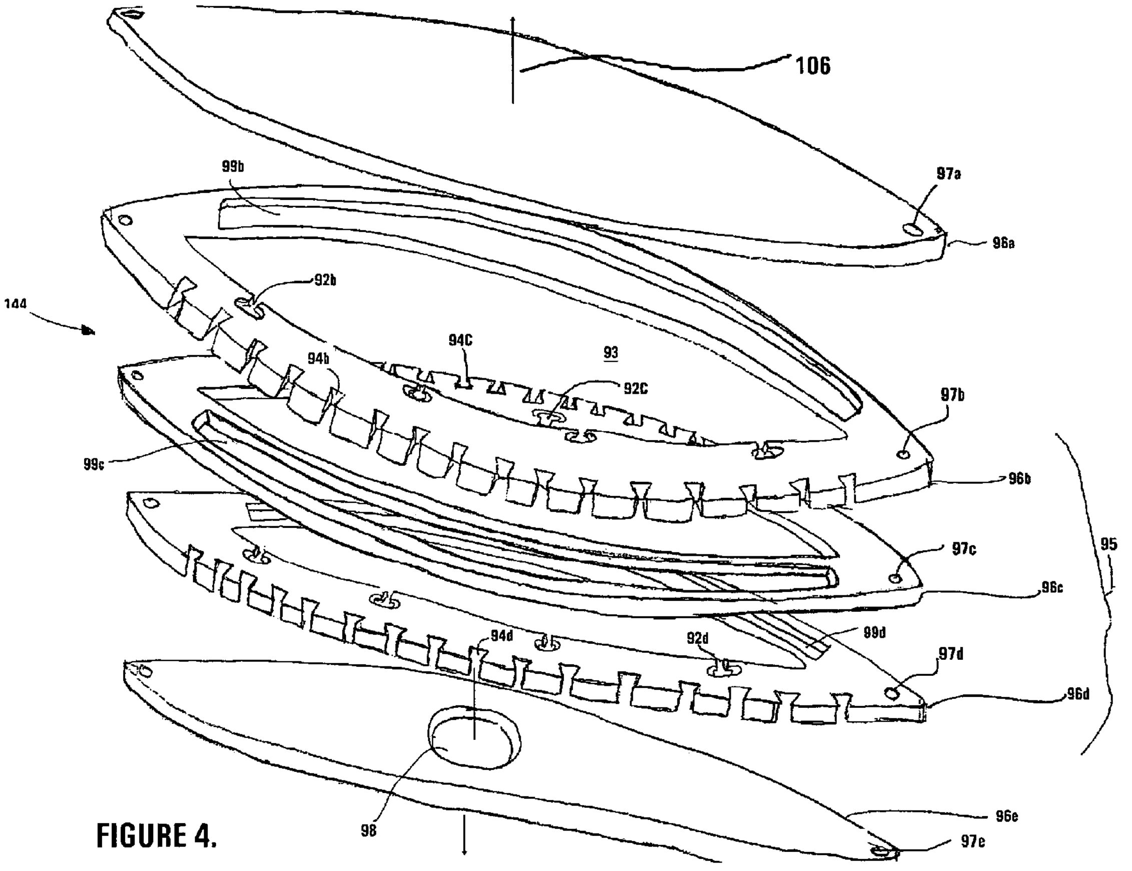
FIG. 4 is an illustrative perspective view of an aerodynamic sparger comprised of a plurality of alternating stacked disks with reduced aerodynamic resistance achieved by forming the disks in the shape of an airfoil.

Referring now to FIG. 4, one embodiment of an aerodynamic sparger 144 is illustrated in perspective view. The primary function of the aerodynamic sparger 144 within the turbine exhaust duct 38 is to reduce the steam pressure before it enters the air-cooled condenser. As shown in FIG. 4, a flow sector 95 of the aerodynamic sparger 144 is generally comprised of a stack of three elliptically shaped disks 96*b–d* having a substantially similar profile aligned with guide holes 97*b–d*. Each disk 96*b–d* integrates a plurality of inlet slots 92*b–d*, a plurality of outlet slots 94*b–d*, and a plurality of interconnecting plenums 99*b–d* within a single disk. By selectively orienting the disks 96*b–d* about a central axis 106, as shown, a series of axial and lateral passageways are created.

During operation, fluid enters the sparger 144 through the inlets slots 92*b–d* in a hollow center 93 of the disks 96*b–d* and flows through the passageways created by the interconnecting plenums 99*b–d*. The restrictive nature of the passageways accelerates the fluid as it moves through them. The plenums 99*b–d* create fluid chambers within the individual layers of the stacked disks and connect the inlet slots 92*b–d* to the outlet slots 94*b–d* allowing both axial and lateral flow within the disks 96*b–d*. The flow path geometry created within the sparger 144 produces staged pressure drops by subdividing the flow stream into smaller portions to reduce fluid pressure and further suppress noise generation by mixing the fluid within the fluid chambers.

The total number of disks used in each sparger is dependent upon the fluid properties and the physical constraints of the application in which the sparger will be placed. The noise abatement device 46 has an inlet area to the outlet area ratio of approximately 6.5 to 1. Those skilled in the art recognize that deviations from the inlet area-to-outlet area ratio can be made without parting from the spirit and scope of the present noise abatement device. Further, a solid top disk 96*a* and a mounting plate 96*e* form to the top surface and bottom surface of the sparger 144 to direct fluid flow through the sparger 144 and provide mounting arrangements within the turbine exhaust duct 38, respectively. The bottom plate 96*e* may include a port 98 that connects directly to the piping 41*a* to receive conditioning steam 35 from the bypass circuit 19 (shown in FIG. 1A). The disks 96*b–d*, the top plate 96*a*, the bottom plate 96*e* and the piping 40 (Shown in FIG. 4) may be attached by conventional means such as welding, but those skilled in the art recognize that alternate attachment means may be used.

Although the noise abatement device 46 is designed using alternating disks, other embodiments are conceivable. For example, a tortuous flow path could be created using one or more disks where the tortuous flow paths connect the fluid inlet slots at the hollow center to the fluid outlet slots at the disk perimeter.

Figure 5:
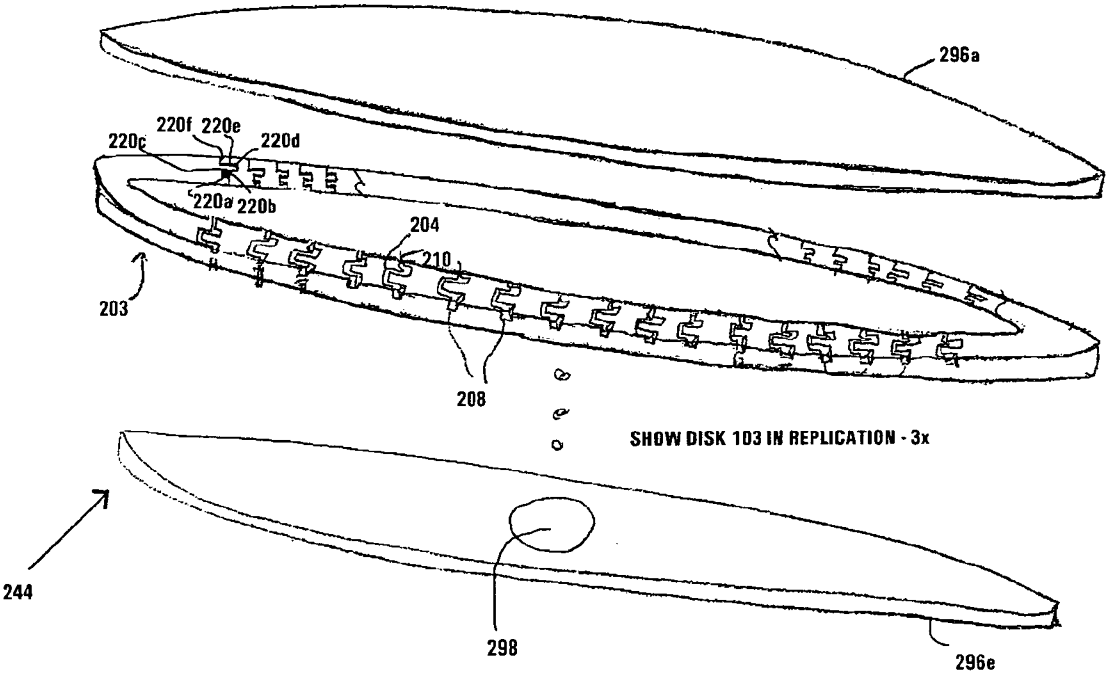
FIG. 5 is an illustrative perspective view of an aerodynamic sparger comprised of a plurality of stacked disks with the torturous fluid path through a section of each disk.

An illustrative perspective view of an alternate embodiment of a sparger provided with a single disk of the present noise abatement device using tortuous paths with a blocked sector is depicted in FIG. 5. The tortuous path sparger 244 is comprised of a plurality of disks 203 with an elliptical profile similar to those of the noise abatement device 46. In the disks 203, fluid obstructers 220*a*–220*f* are positioned on the surface of each disk 203 to create tortuous passageways 204 that, become progressively more restrictive. As previously explained, fluidic restrictions increase fluid velocity and consequently produce a corresponding decrease in fluid pressure at the outlet or on the downstream side of the restriction. Therefore, the velocity of the fluid entering the tortuous paths 204 of the sparger 244 through inlet slots 210 increases as the fluid progresses toward the fluid outlet slots 208. The fluid pressure is dramatically reduced as the fluid exits the fluid outlet slots 208. Similar to the noise abatement device 46, a solid top plate 296*a* and a bottom mounting plate 296*e* are attached to the top surface and bottom surface of the sparger 244 to direct fluid flow through the sparger 244 and provide mounting arrangements for the noise abatement device. The bottom plate 296*e* further includes a port 298 that connects directly to piping (not shown) to receive conditioned steam 35 from the turbine bypass circuit 19 (shown in FIG. 1A). The disks 203, the top plate 296*a*, and the bottom plate 296*e* can be attached by conventional means such as welding, but those skilled in the art recognize that alternate attachment means may be used.

Figure 6:
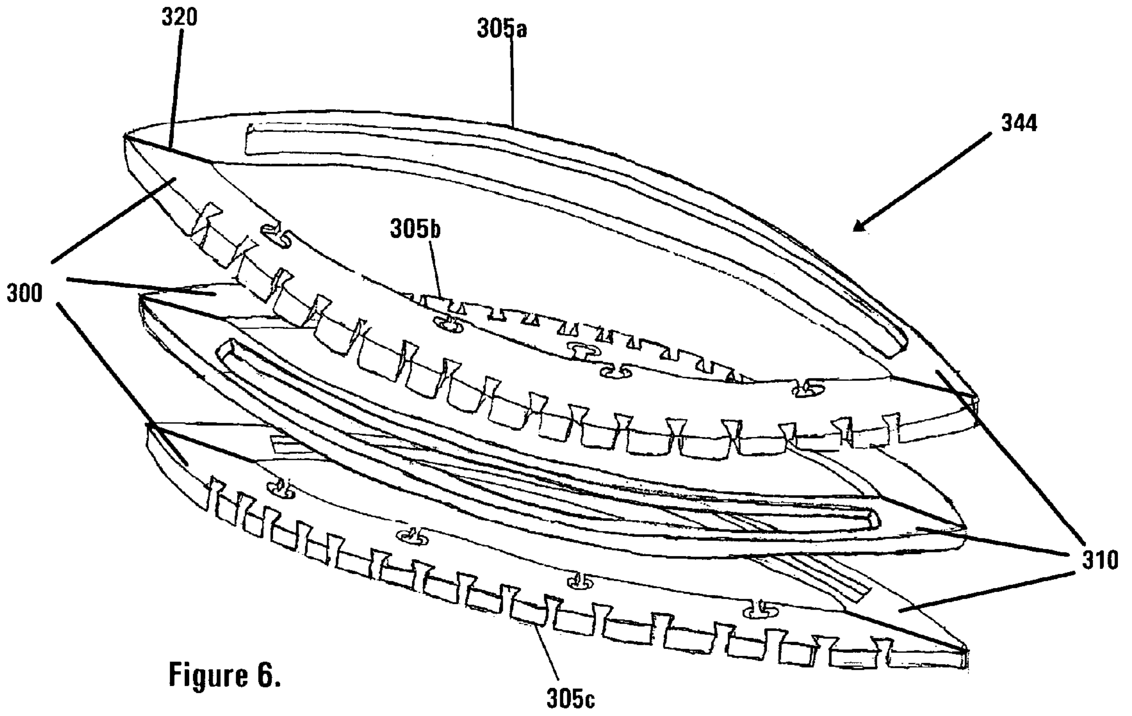
FIG. 6 is an illustrative perspective view of an aerodynamic sparger assembled from individual flow sectors and plenum sectors.

The foregoing detailed description has been given for clearness of understanding only, and no unnecessary limitations should be understood therefrom, as modifications will be obvious to those skilled in the art. For example, the aerodynamic sparger can be constructed from a continuous hollow cylinder with direct radial fluid passageways. It can further be appreciated by those skilled in the art that the noise abatement device 46 could be constructed using the alternating disks wherein alternating disks with individual flow disks and individual plenum disks are used to create the axial and lateral passageways. Additionally, other manufacturing and assembly processes can be used to efficiently fabricate the disks within an aerodynamic sparger 344 shown in FIG. 6. For example, individual flow sectors 300 and plenum sectors 310 can be produced using Electric Discharge Machining (EDM) methods and subsequently combined by conventional manufacturing techniques, such as a laser weld 320, to create each individual disk 305*a–c*. It can also be appreciated by those skilled in the art that in some cases the conformation of the aerodynamic profile could be modified from the elliptical cross-section detailed herein without departing from the spirit and scope of the present sparger and noise abatement device.

What is claimed is:

1. A sparger adapted for placement within a duct, the duct having a first fluid flow substantially parallel to a longitudinal axis defined by the duct, the sparger comprised of:

a housing having an elliptical shape defining a substantially similar leading edge and trail edge, the housing forming an interior chamber for receiving a second fluid flow having an associated pressure higher than the first fluid flow wherein the housing shape provides a substantially reduced back pressure as encountered by the first fluid flow; and a plurality of fluid passageways formed by the housing to allow the second fluid flow to pass through the chamber to enter the first fluid flow at a decreased pressure.

2. The sparger of claim 1, wherein the housing is comprised of a plurality of stacked disks aligned about a central axis of the stacked disks.

3. The sparger of claim 2, wherein each disk is selectively positioned in the stack of disks to form the fluid passageways, each disk having (a) fluid inlet slots partially extending from a hollow disk center towards a disk perimeter, (b) fluid outlet slots partially extending from the disk perimeter towards the disk center, and (c) at least one plenum slot extending through the disk to enable fluid flow from the fluid inlet slots in one disk to the plenum slots in adjacent disks and to the fluid outlet slots in at least one disk, wherein the fluid flow path is split into a plurality of axial directions along the central axis, then into the plenum slots with a plurality of lateral flow directions, and then distributed through multiple outlet slots in at least one disk.

4. A sparger according to claim 3, wherein the plenum slot in the adjacent disk also enables fluid flow from the fluid inlet slots in one disk to be coupled to multiple fluid outlet slots in respective disks in the stack adjacent to the adjacent disk.

5. The sparger of claim 2, wherein each respective fluid passageway is comprised of a tortuous flow path with each tortuous flow path remaining independent from each other in traversing through the disk.

6. The sparger of claim 3, wherein the fluid inlet slots and the fluid outlet slots are formed within a flow sector and the plenum slot is formed a plenum sector wherein the flow sector and plenum sector are joined to form an individual disk.

7. A noise abatement device for turbine bypass in air-cooled condensers comprised of:

a plurality of spargers adapted for placement within a duct having a first fluid flow, the first fluid flow being substantially parallel to a longitudinal axis of the duct;

at least one of the plurality of spargers comprising a housing having an interior chamber for receiving a second higher pressure fluid flow such that the housing forms a plurality of fluid passageways to allow the second fluid of higher pressure to flow through the chamber and enter the first fluid flow within the duct at a decreased pressure; and the at least one of the plurality of spargers having an elliptical shape defining a substantially similar leading edge and trailing edge and being collinearly arranged along the longitudinal axis to substantially reduce the aerodynamic resistance of the spargers with respect to the first fluid flow thereby providing a substantially reduced back pressure upstream from the at least one of the plurality of spargers within the duct.

8. The noise abatement device of claim 7, wherein the housing of each sparger is comprised of a plurality of stacked disks aligned about a central axis of the plurality of stacked disks.

9. The noise abatement device of claim 8, wherein each respective fluid passageway is comprised of a tortuous flow path with each tortuous flow path remaining independent from each other in traversing through the disk.

10. The noise abatement device of claim 8, wherein each disk is selectively positioned in the stack of disks to form the fluid passageways, each disk having (a) fluid inlet slots partially extending from a hollow disk center towards a disk perimeter, (b) fluid outlet slots partially extending from the disk perimeter towards the disk center, and (c) at least one plenum slot extending through the disk to enable fluid flow from the fluid inlet slots in one disk to the plenum slots in adjacent disks and to the fluid outlet slots in at least one disk, wherein the fluid flow path is split into plurality of axial directions along the central axis, then into the plenum slots with a plurality of lateral flow directions, and then distributed through multiple outlet slots in at least one disk.

11. The noise abatement device of claim 10, wherein the fluid inlet slots and the fluid outlet slots are formed within a flow sector and the plenum slot is formed within a plenum sector wherein the flow sector and plenum sector are joined to form an individual disk.

12. A method of reducing the aerodynamic resistance within a turbine exhaust duct having a first fluid flow, the method comprising the steps of:

fashioning a sparger with a housing having an interior chamber, the housing forming a plurality of fluid passageways for receiving and transferring a second higher pressure fluid flow into the first fluid flow at a controlled rate wherein the housing is elliptically shaped to define substantially similar leading and trailing edges of the sparger to have an aerodynamic profile such that the aerodynamic resistance is substantially reduced as encountered by the first fluid flow to reduce a back pressure upstream from the sparger; and mounting the noise abatement device comprised of at least one sparger within a turbine exhaust duct, the noise abatement device being generally symmetrically situated within the turbine exhaust duct.

* * * * *

UNITED STATES PATENT AND TRADEMARK OFFICE

CERTIFICATE OF CORRECTION

PATENT NO. : 7,185,736 B2
APPLICATION NO. : 10/647799
DATED : March 6, 2007
INVENTOR(S) : Michael W. McCarty It is certified that error appears in the above-identified patent and that said Letters Patent is hereby corrected as shown below:

Title Page:

Item (73), "LLC." should be -- LLC --.

On Page 2:

Item (56), Other Publications, left column, 1st reference, "COntrols" should be -- Controls --.

Signed and Sealed this

Fourteenth Day of October, 2008

JON W. DUDAS
*Director of the United States Patent and Trademark Office*